US011608431B2

(12) United States Patent
Aurisicchio et al.

(10) Patent No.: US 11,608,431 B2
(45) Date of Patent: Mar. 21, 2023

(54) TREAD COMPOUND

(71) Applicant: Bridgestone Europe NV/SA, Zavenlem (BE)

(72) Inventors: Claudia Aurisicchio, Rome (IT); Raffaele Di Ronza, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 241 days.

(21) Appl. No.: 16/647,980

(22) PCT Filed: Oct. 22, 2018

(86) PCT No.: PCT/EP2018/078847
§ 371 (c)(1),
(2) Date: Mar. 17, 2020

(87) PCT Pub. No.: WO2019/081406
PCT Pub. Date: May 2, 2019

(65) Prior Publication Data
US 2020/0263004 A1   Aug. 20, 2020

(30) Foreign Application Priority Data
Oct. 25, 2017   (IT) .................. 102017000121295

(51) Int. Cl.
| | |
|---|---|
| *C08L 9/06* | (2006.01) |
| *B60C 1/00* | (2006.01) |
| *B60C 11/00* | (2006.01) |
| *C08K 5/00* | (2006.01) |

(52) U.S. Cl.
CPC ............. *C08L 9/06* (2013.01); *B60C 1/0016* (2013.01); *B60C 11/0008* (2013.01); *C08K 5/0016* (2013.01); *B60C 2011/0025* (2013.01); *C08L 2205/025* (2013.01); *C08L 2205/03* (2013.01); *C08L 2207/04* (2013.01)

(58) Field of Classification Search
CPC ................ C08L 9/06; C08L 2205/025; C08L 2205/03; C08L 2207/04; B60C 1/0016; B60C 11/0008; B60C 2011/0025; C08K 5/0016
USPC ........................................ 524/282
See application file for complete search history.

(56) References Cited

U.S. PATENT DOCUMENTS

| | | | |
|---|---|---|---|
| 4,748,199 | A | 5/1988 | Takiguchi et al. |
| 5,385,969 | A | 1/1995 | Saito et al. |
| 2006/0060285 | A1 | 3/2006 | Weydert et al. |
| 2011/0144236 | A1 | 6/2011 | Mihara |
| 2013/0310483 | A1 | 11/2013 | Botti et al. |
| 2014/0024745 | A1 | 1/2014 | Vasseur et al. |
| 2015/0126674 | A1 | 5/2015 | Sato |
| 2015/0283854 | A1 | 10/2015 | Saintigny et al. |
| 2016/0168339 | A1 | 6/2016 | Grenci et al. |
| 2016/0280007 | A1 | 9/2016 | Cato et al. |
| 2016/0280886 | A1 | 9/2016 | Cossu et al. |
| 2017/0174001 | A1 | 2/2017 | Miyazaki et al. |

FOREIGN PATENT DOCUMENTS

| | | | |
|---|---|---|---|
| JP | 2009263456 | A | 4/2008 |
| JP | 2013159714 | A * | 8/2013 |
| JP | 2016037556 | A | 3/2016 |
| JP | 2016183263 | A | 10/2016 |
| WO | 2015007577 | A1 | 1/2015 |
| WO | 2015114610 | A1 | 8/2015 |

OTHER PUBLICATIONS

JP 2013-159714 A, machine translation, EPO Espacenet. (Year: 2013).*
"Compound Summary for CID 8122, Ethyl stearate," PubChem, National Center for Biotechnology Information [retrieved May 27, 2022], Retrieved from the Internet: <URL: https://pubchem.ncbi.nlm.nih.gov/compound/8122>. (Year: 2022).*
Compound Summary for CID 31284, Methyl tetradecanoate, PubChem, National Center for Biotechnology Information [retrieved May 26, 2022], Retrieved from the Internet: <URL: https://pubchem.ncbi.nlm.nih.gov/compound/31284>. (Year: 2022).*
"Compound Summary for CID 8139, Methyl dodecanoate," PubChem, National Center for Biotechnology Information [retrieved May 27, 2022], Retrieved from the Internet: <URL: https://pubchem.ncbi.nlm.nih.gov/compound/8139>. (Year: 2022).*
"Compound Summary for CID 8181, Methyl palmitate," PubChem, National Center for Biotechnology Information [retrieved May 27, 2022], Retrieved from the Internet: <URL: https://pubchem.ncbi.nlm.nih.gov/compound/Methyl-palmitate>. (Year: 2022).*
International Preliminary Report on Patentability with Written Opinion from PCT application No. PCT/EP2018/078847, dated Apr. 2020 (6 pages).
International Search Report from PCT application No. PCT/EP2018/078847, dated Feb. 2019 (4 pages).
Safety Data Sheet for methyl stearate, downloaded from www.sigmaaldrich.com in Mar. 2022.
Safety Data Sheet for methyl pentadecanoate, downloaded from www.sigmaaldrich.com in Mar. 2022.
Safety Data Sheet for methyl palmitate, downloaded from www.sigmaaldrich.com in Mar. 2022.
Sadeghazad, Ayoub et al. "Prediction of Cloud Point Temperature: In Wax Deposition," Paper presented at the SPE Asia Pacific Oil and Gas Conference and Exhibition, Brisbane, Australia, Oct. 2000, Paper No. SPE-64519-MS, Oct. 2020 (Abstract only).

(Continued)

*Primary Examiner* — Ling Siu Choi
*Assistant Examiner* — Ronald Grinsted
(74) *Attorney, Agent, or Firm* — Sara Cipollone; Jenny L. Sheaffer

(57) ABSTRACT

A rubber compound for the preparation of a tread portion of a pneumatic tyre. The compound comprises at least one cross-linkable unsaturated chain polymer base capable of assuming all of the chemical-physical and mechanical characteristics of an elastomer after cross-linking, a filler comprising silica, a plasticizing agent and a curing system. The cross-linkable unsaturated chain polymer base has a peak Tan δ value between −15° C. and 5° C. while the plasticizing agent is made up of an aliphatic chain comprising at least one polar group and has a melting temperature of between 5° C. and 40° C.

20 Claims, No Drawings

(56) References Cited

OTHER PUBLICATIONS

Patel et al., "Castor Oil: Properties, Uses, and Optimization of Processing Parameters in Commercial Production," Lipid Insights, 2016, vol. 9, pp. 1-12.
Isbell et al., "Physical Properties of Estolides and Their Ester Derivatives," Industrial Crops and Products, vol. 13, issue 1, pp. 11-20, Jan. 2001.

* cited by examiner

12# TREAD COMPOUND

The present invention relates to a tread compound.

Part of the research in the field of pneumatic tyres is concentrated upon obtaining a tread that has ever improved performance in terms of differing usage conditions. As is known to a person skilled in the art, it is often technically difficult to make a tread that has simultaneous improvements with regard to differing characteristics, such as for example winter performance, wet grip, rolling resistance and wear resistance.

While it is possible to improve the aforementioned characteristics independently of one another, there are greater difficulties in obtaining simultaneous improvements in all characteristics without, consequently, the improvement of one leading to the worsening of all of the others.

For example, as is known to a person skilled in the art, a tread compound with a high reinforcing filler content improves the rolling resistance thereof, but also worsens the wet grip thereof; conversely, a tread compound with a low of reinforcing filler content improves the wet grip thereof but worsens rolling resistance thereof.

In fact, it is known that an increase in the compound of the quantity of silica or the use in the compound of low molecular weight resins, even though they result in an improvement in wet grip, result in a worsening in terms of the rolling resistance and abrasion resistance.

In this respect, it should be remembered that it has long been known to use silica as a reinforcing filler in tread compounds. The silica is used as a partial or total replacement for the carbon black and in combination with silane binders, which in binding to the silanol groups inhibit the formation of hydrogen bonds between the particles of silica.

The requirement was felt, therefore, to have a solution for silica containing tread compounds that are capable of ensuring, in a single solution, an improvement in terms of winter performance, wet grip, rolling resistance and abrasion resistance.

The inventors of the present invention have found that by combining a polymer base characterized by certain peak values of Tan δ and a plasticizing agent with a melting temperature within a specific range, it is possible to impart to the resulting tread compound improvements that are in line with the aforementioned requirements.

As is known to a person skilled in the art, Tan δ is the ratio between the shear modulus and the elastic modulus.

In essence, Tan δ is used to quantify the dissipation of the viscoelastic material. The peak Tan δ value indicates the temperature at which the Tan δ value of a polymer base is at a maximum.

The object of the present invention is a rubber compound for the preparation of a tread portion of a pneumatic tyre; said rubber compound comprising at least one cross-linking unsaturated chain polymer base, a silica comprising filler, a plasticizing agent and a curing system; said rubber compound being characterized in that said cross-linking unsaturated chain polymer base has a peak Tan δ value between −15° C. and 5° C. and in that said plasticizing agent consists of an aliphatic chain comprising at least one polar group and has a melting temperature of between 5° C. and 40° C.

Here and hereinafter, the term "cross-linkable unsaturated-chain polymer base" refers to any natural or synthetic non-cross-linked polymer capable of assuming all of the chemical-physical and mechanical characteristics typically assumed by elastomers after cross-linking (curing) with sulfur or peroxide systems.

Here and hereinafter, the term curing system refers to a complex of ingredients comprising at least sulfur and accelerating compounds that in the preparation of the compound are added during a final blending stage and have the purpose of promoting the polymer base curing once the compound is subjected to a curing temperature.

Preferably, said cross-linkable unsaturated chain polymer base has a peak Tan δ value between −8° C. and 5° C. and said plasticizing agent has a melting temperature of between 15° C. and 30° C.

Preferably, said polar group is an ester group.

Preferably, the aliphatic chain has a length of between C12 and C18.

Preferably, said plasticizing agent is present in the compound in an amount of between 1 and 10 phr.

Preferably, said cross-linkable unsaturated chain polymer base is composed of a mixture of styrene-butadiene rubber and polybutadiene rubber.

A further object of the present invention is a tread portion manufactured with a rubber compound according to the present invention and a pneumatic tyre comprising such a tread portion.

For a better understanding of the present invention, the following examples are included for illustrative and non-limiting purposes.

EXAMPLES

Two sets of compounds were prepared.

The first set comprises three comparative compounds (Compounds A-C) wherein conventional approaches were used, and a compound according to the teachings of the present invention (Compound D). All of the compounds of the first set comprise the same polymer base characterized by a peak Tan δ value according to the teachings of the present invention. In particular, Compound A is free of plasticizing agent; Compound B differs from Compound A by the fact that it comprises a plasticizing agent characterized by a glass transition temperature that is lower than the melting temperature of the plasticizing agent of the present invention, Compound C differs from Compound A by the fact that it comprises a plasticizing agent characterized by a softening temperature that is higher than the melting temperature of the plasticizing agent of the present invention, and Compound D differs from Compound A by the fact that it comprises a plasticizing agent with a melting temperature that is in line with that provided according to the present invention.

The second set comprises two comparative compounds (Compound E and F) that use the same polymer base characterized by a peak Tan δ value that is lower than that provided according to the present invention. In particular, Compound E is free of plasticizing agent and Compound F differs from Compound E by the fact that it comprises a plasticizing agent that is characterized by a melting temperature that is in line with that provided according to the present invention.

The compounds described in the examples were obtained according to the procedure provided below:
Preparation of the Compounds
(1st Mixing Step)

Before the start of the mixing, a mixer with tangential rotors and an internal volume of between 230 and 270 liters was loaded with the cross-linkable polymer base, the Silica, the silane binder, and where provided, the plasticizing agent thereby reaching a fill factor of 66-72%.

The mixer was operated at a speed of 40-60 revolutions/minute, and the mixture thus formed was discharged once a temperature of 140-160° C. had been reached.

(2nd Mixing Step)

The mixture obtained from the previous step was reworked in a mixer that was operated at a speed of 40-60 revolutions/minute and, thereafter, discharged once a temperature of 130-150° C. had been reached.

(3rd Mixing Step)

To the mixture obtained from the previous step there was added the curing system (sulfur, accelerants, antioxidants/antiozonants, zinc oxide and stearic acid), reaching a fill factor of 63-67%.

The mixer was operated at a speed of 20-40 revolutions/minute, and the mixture thus formed was discharged once a temperature of 100-110° C. had been reached.

Table I lists the compositions in phr of the six compounds.

TABLE I

|   | A | B | C | D | E | F |
|---|---|---|---|---|---|---|
| S-SBR | 70 | 70 | 70 | 70 | — | — |
| E-SBR | 20 | 20 | 20 | 20 | 80 | 80 |
| BR | 10 | 10 | 10 | 10 | 20 | 20 |
| SILICA | 88 | 88 | 88 | 88 | 88 | 88 |
| SILANE | 11 | 11 | 11 | 11 | 11 | 11 |
| Plasticizing agent* | — | 5 | — | — | — | — |
| Plasticizing agent** | — | — | 5 | — | — | — |
| Plasticizing agent*** | — | — | — | 5 | — | 5 |
| Sulfur | 1.5 | 1.5 | 1.5 | 1.5 | 1.5 | 1.5 |
| Zinc oxide | 1.7 | 1.7 | 1.7 | 1.7 | 1.7 | 1.7 |
| Stearic acid | 1 | 1 | 1 | 1 | 1 | 1 |
| TMQ | 0.3 | 0.3 | 0.3 | 0.3 | 0.3 | 0.3 |
| TBBS | 1.75 | 1.75 | 1.75 | 1.75 | 1.75 | 1.75 |
| MBTS | 1.1 | 1.1 | 1.1 | 1.1 | 1.1 | 1.1 |
| DPG | 1.8 | 1.8 | 1.8 | 1.8 | 1.8 | 1.8 |

S-SBR is a polymer base obtained through a solution polymerization process with an average molecular weight, respectively, of 800-1500×10³ and of 500-900×10³, with a styrene content of between 20 and 45%.

E-SBR is a polymer base obtained through an emulsion polymerization process in an emulsion with an average molecular weight, respectively, of 800-1500×10³ and of 500-900×10³, with a styrene content of between 20 and 45% and used with an oil content of between 0 and 30%;

BR is a butadiene rubber with a 1,4-cis content of at least 40%.

The polymer base used in the compounds A-D is characterized by a peak Tan δ value equal to 1° C., while the polymer base used in the compounds E and F is characterized by a peak Tan δ value equal to −38° C.

The silica used is marketed under the name VN3 by the company EVONIK and has a surface area of about 170 m²/g;

The silane binder used has the formula $(CH_3CH_2O)_3Si(CH_2)_3SS(CH_2)_3Si(OCH_2CH_3)_3$ and is marketed under the name SI75 by the company EVONIK;

The plasticizing agent* is an MES oil characterized by a glass transition temperature of approximately −60° C. (lower than the melting temperature of the plasticizing agent used according to the present invention).

The plasticizing agent** is an aromatic resin characterized by a softening temperature of approximately 90° C. (higher than the melting temperature of the plasticizing agent used according to the present invention).

The plasticizing agent*** is a pentadecanoic acid methyl ester characterized by a melting temperature of 20° C. (in line with that provided according to the present invention).

TMQ is the acronym for poly(1,2-dihydro-2,2,4-trimethylquinoline) and is used as an antioxidant;

TBBS is the acronym for the N-tert-butyl-2benzothiazyle sulfonamide compound, and is used as a curing accelerant.

MBTS is the acronym for the Mercaptobenzothiazole disulphide compound, and is used as a curing accelerant.

DPG is the acronym for the Diphenyl-guanidine compound and is used as a curing accelerant.

The compounds A-F were subjected to a series of tests in order to evaluate the winter performances, wet grip, rolling resistance and wear resistance.

In particular, according to the ASTM D5992 standard, the E' values at −20° C. were measured in order to evaluate the winter performances, and the TanD value at 0° C. according to the ASTM D5992 standard in order to evaluate the wet grip and rolling resistance.

The abrasion resistance was obtained according to the DIN 53 516 standard.

Table II lists the results obtained from the tests described above. The values relative to compounds A-D are indexed to Compound A, while the values relative to compounds E and F are indexed to the Compound E.

TABLE II

|   | A | B | C | D | E | F |
|---|---|---|---|---|---|---|
| Winter performances | 100 | 115 | 90 | 120 | 100 | 100 |
| Wet grip | 100 | 95 | 105 | 105 | 100 | 101 |
| Rolling resistance | 100 | 108 | 95 | 105 | 100 | 97 |
| Abrasion resistance | 100 | 90 | 92 | 106 | 100 | 100 |

As can be seen from the data of Table II, the compound obtained according to the teachings of the present invention (Compound D) has an overall improvement for all four of the characteristics investigated.

In particular, from a comparison between the results relative to the compounds B and C it is clear that the use of a plasticizing agent with a melting temperature that does not fall within the range according to the present invention does not result in the required advantages, i.e., the simultaneous improvement of all four of the characteristics analyzed. In fact, compound B, while producing an improvement in terms of winter performances and rolling resistance, at the same time results in a deterioration in terms of wet grip and wear resistance. In comparison, compound C while producing an improvement with regard to wet grip, simultaneously results in the worsening of the other three characteristics.

In particular, it should be noted how the use of a polymer base characterized by the claimed peak Tan δ values and of a plasticizing agent with a melting temperature that falls within the claimed range ensures a surprisingly marked improvement in terms of wear resistance.

From a comparison between the values relative to compound E and compound F, it is evident how the use of a plasticizing agent with a melting temperature that falls within the claimed range does not result in the advantages sought when the polymer base of the compound does not meet the peak Tan δ value requirements according to the invention.

The invention claimed is:

1. A rubber compound for the preparation of a tread portion of a pneumatic tyre, said rubber compound comprising at least one cross-linkable unsaturated chain polymer base capable of assuming all of the chemical-physical and mechanical characteristics of an elastomer after cross-linking, a filler comprising silica, a plasticizing agent in an amount of 1 to about 10 phr, and a curing system; said rubber compound wherein said cross-linkable unsaturated chain polymer base has a peak Tan δ value between −15° C. and 5° C. and in that said plasticizing agent consists of a C12 to C18 aliphatic chain and at least one polar group the plasticizing agent having a melting temperature of between 20° C. and 40° C.

2. The rubber compound according to claim 1, characterized in that said cross-linkable unsaturated chain polymer base has a peak Tan δ value between −8° C. and 5° C. and said plasticizing agent has a melting temperature of between 20° C. and 30° C.

3. The rubber compound according to claim 1, characterized in that said polar group is an ester group.

4. The rubber compound according to claim 1, wherein said aliphatic chain has a length of between C14 and C18.

5. The rubber compound according to claim 1, wherein said plasticizing agent is present in compound in an amount of between 1 and 5 phr.

6. The rubber compound according to claim 1, wherein said cross-linkable unsaturated chain polymer base is composed of a mixture of styrene-butadiene rubber and polybutadiene rubber.

7. A tread portion manufactured with the rubber compound according to claim 1.

8. A pneumatic tyre comprising the tread portion according to claim 7.

9. The rubber compound according to claim 3, wherein the ester polar group is a methyl ester.

10. The rubber compound according to claim 1, wherein the filler comprising silica includes 88 phr of silica.

11. The rubber compound according to claim 1, where the plasticizing agent has a melting temperature of between 20° C. and 30° C.

12. A tread rubber compound for a pneumatic tyre, said tread rubber compound comprising at least one cross-linkable unsaturated chain polymer base capable of assuming all of the chemical-physical and mechanical characteristics of an elastomer after cross-linking, a filler comprising silica, a plasticizing agent in an amount of 1 to about 10 phr, and a curing system; said tread rubber compound wherein said cross-linkable unsaturated chain polymer base has a peak Tan δ value between −15° C. and 5° C. and in that said plasticizing agent consists of a C12 to C18 aliphatic chain and at least one ester polar group, the plasticizing agent having a melting temperature of between 20° C. and 40° C. and including pentadecanoic acid methyl ester.

13. The tread rubber compound according to claim 12, wherein said cross-linkable unsaturated chain polymer base has a peak Tan δ value between −8° C. and 5° C. and said plasticizing agent has a melting temperature of between 20° C. and 30° C.

14. The tread rubber compound according to claim 12, wherein said aliphatic chain has a length of between C14 and C18.

15. The tread rubber compound according to claim 12, characterized in that said plasticizing agent is present in compound in an amount of between 1 and 5 phr.

16. The tread rubber compound according to claim 12, wherein said cross-linkable unsaturated chain polymer base is composed of a mixture of styrene-butadiene rubber and polybutadiene rubber.

17. The tread rubber compound according to claim 12, wherein the ester polar group is a methyl ester.

18. The tread rubber compound according to claim 12, wherein the filler comprising silica includes 88 phr of silica.

19. The tread rubber compound according to claim 12, wherein the plasticizing agent has a melting temperature of between 20° C. and 30° C.

20. The tread rubber compound according to claim 12, wherein the plasticizing agent is pentadecanoic acid methyl ester.

\* \* \* \* \*